AUTOMATIC DEVELOPMENT CONTROLLER

Original Filed June 1, 1966 3 Sheets-Sheet 1

INVENTOR.
ROMAN C. KAMOLA
BY B. A. Chaine
Norman P. Schenker
ATTORNEYS

AUTOMATIC DEVELOPMENT CONTROLLER

Original Filed June 1, 1966 3 Sheets-Sheet 2

INVENTOR.
ROMAN C. KAMOLA
BY D. A. Chesser
Norman P. Schaefer
ATTORNEYS

AUTOMATIC DEVELOPMENT CONTROLLER

Original Filed June 1, 1966 3 Sheets-Sheet 3

INVENTOR.
ROMAN C. KAMOLA
BY
ATTORNEYS

United States Patent Office

Re. 27,480
Reissued Sept. 19, 1972

27,480

AUTOMATIC DEVELOPMENT CONTROLLER

Roman C. Kamola, North Rose, N.Y., assignor to Xerox Corporation, Rochester, N.Y.

Original No. 3,376,854, dated Apr. 9, 1968, Ser. No. 554,522, June 1, 1966. Application for reissue July 3, 1969, Ser. No. 846,986
Int. Cl. G03g *15/08*
U.S. Cl. 118—7 3 Claims

Matter enclosed in heavy brackets [ ] appears in the original patent but forms no part of this reissue specification; matter printed in italics indicates the additions made by reissue.

ABSTRACT OF THE DISCLOSURE

A toner concentration control system for a recording apparatus in which a sensor comprising two parallel spaced NESA glass plates through which developer material flows serves to generate signals to automatically control toner dispensing. The lower plate has a pattern which is held at a potential to attract toner. A light source and photocell on either side of the plate senses the toner deposit per unit of time in accordance with toner concentration. Another photocell is arranged as a leg of a bridge circuit which includes the first photocell such that when the latter senses a toner situation away from the desired density effect, an unbalance of the bridge occurs causing toner dispensing.

This invention relates to improvements in toner dispensing devices and particularly to improvements in the automatic control of these devices to maintain the image density constant during the making of xerographic reproductions.

The present invention avoids the disadvantages of manual control for dispensing toner particles into developing material used in xerographic processing equipment. This method of control is generally based upon guesswork by the operator who must continually observe the reproduction copy quality in order to maintain a reproduction run that is fairly constant in regard to image density. For automatic xerographic processing wherein the large production runs are frequent, an experienced operator must be in attendance to insure good control.

Therefore, the principal object of the invention is to control toner dispensing automatically in xerographic processing systems. A further object of the invention is to maintain consistency in image quality during xerographic processing. Another object of the invention is to determine and maintain the proper ratio of toner-to-carrier in xerographic developing material.

These and other objects of the invention are attained by means of a control circuit utilized in conjunction with a toner dispensing device for dispensing toner into a developing apparatus in accordance with the density of a developed image upon a xerographic plate. The amount of toner particles in the developing material is proportional to the amount that will deposit upon a surface that is charged with a voltage having a polarity opposite that upon the toner particles. This proportionality is utilized to control the amount of toner within the apparatus and, to this end, a sensor having a predetermined pattern on a charged surface is placed within the apparatus to receive some of the developing material falling thereon. A positive potential is placed upon the pattern (for systems wherein negative charged toner is used) and a negative charge is placed upon the area of the surface adjacent the pattern. This causes toner to be attracted to the pattern.

The amount of toner attracted to the pattern, for any paricular period of time, is related to the toner concentration in the developer apparatus. The sensor is connected in an electrical bridge circuit along with a compensating means for producing a signal, which when *the toner concentration is;* below a pre-set level [raises] *causes* a pulse to be generated for introducing toner particles into the machine toner dispensing system.

A preferred form of the invention is shown in the accompanying drawings in which.

Figure 1:
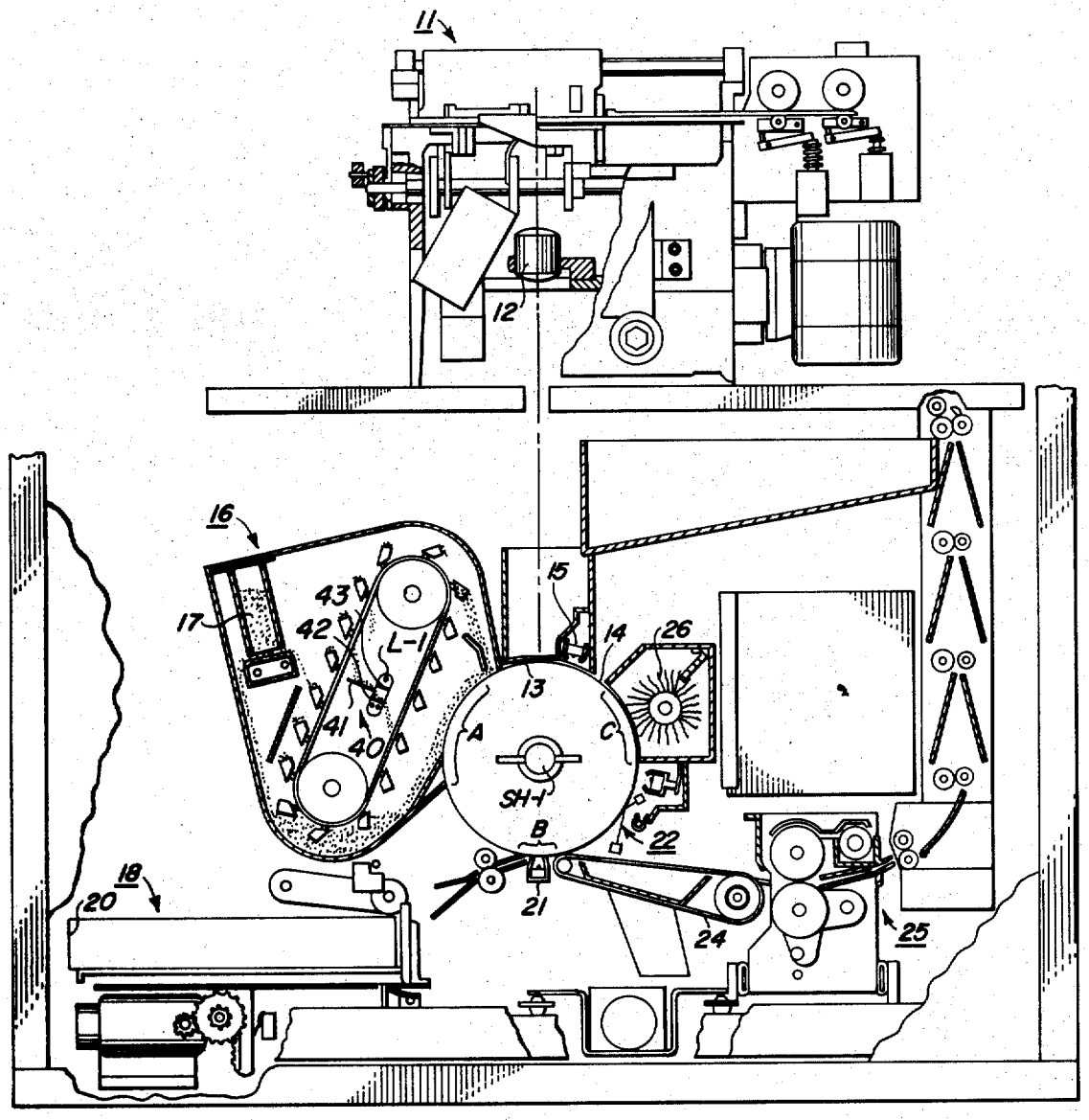
FIG. 1 is a schematic sectional view of a typical xerographic machine embodying the principles of the invention.

For a general understanding of a typical xerographic processing system in which the invention may be incorporated, reference is had to FIG. 1 in which various components of a typical system are schematically illustrated. As in all xerographic systems, a light image of copy to be reproduced is projected onto the sensitized surface of a xerographic plate to form an electrostatic latent image thereon. Thereafter, the latent image is developed with an oppositely charged developing material to form a xerographic powder image, corresponding to the latent image, on the plate surface. The powder image is then electrostatically transferred to a support surface to which it may be fused by a fusing device, whereby the powder image is caused permanently to adhere to the support surface.

In the system disclosed herein, minified data cards are placed in a card magazine from which they are fed seriatim to a card carriage in a card handling apparatus, generally designated by reference character 11. Suitable driving means are provided for the card carriage whereby it is caused to move the card past the optical axis of a light projecting system for the purpose of scanning the minified data across a scanning light. The illuminated card is projected downwardly by means of an objective lens assembly 12 and through a variable slit aperture assembly 13 and onto the surface of a xerographic plate in the form of a drum 14.

The xerographic drum 14 is detachably secured to a shaft SH–1 mounted in suitable bearings in the frame of the machine and is driven in a counterclockwise direction by a motor at a constant rate that is proportional to the scan rate for the minified data car, whereby the peripheral rate of the drum surface is identical to the rate of movement of the reflected light image. The drum surface comprises a layer of photoconductive material on a conductive backing that is sensitized prior to exposure by means of a corona generating device 15.

The exposure of the drum to the light image discharges the photoconductive layer in the areas struck by light, whereby there remains on the drum an electrostatic latent image in configuration corresponding to the light image projected from the minified data card. As the drum surface continues its movement, the electrostatic latent image passes through a developing station A in which there is positioned a developer apparatus including a casing or housing 16 having a lower or sump portion for accumulating developing material. A bucket-type conveyor having a suitable driving means may be used to carry the developing material to the upper part of the developer housing where it is cascaded down over a hopper chute onto the xerographic drum.

As the developing material is cascaded over the xerographic drum, toner particles are pulled away from the arrier component of the developing material and deposited on the drum to form powder images, while the partially-denuded carrier particles pass off the drum into the developer housing sump. As toner powder images are formed, additional toner particles must be supplied to the developing material in proportion to the amount of toner deposited on the drum. For this purpose, a toner dispenser generally designated 17 is used to accurately meter toner to the developing material. Although any one of a number of well-known powder or granulated material dispensers may be used, the toner dispenser shown is of the type disclosed in Patent No. 3,062,109, issued to Mayo et al.

Positioned next and adjacent to the developing station is the image transfer station B which includes a sheet feeding mechanism adapted to feed sheets of paper successively to the developed image on the drum at the transfer station. This sheet feeding mechanism, generally designated 18, includes a sheet source such as tray 20 for a plurality of sheets of a suitable transfer material that is, typically sheets of paper or the like, a separating roller adapted to feed the top sheet of the stack to feed rollers which direct the sheet material into contact with the rotating drum at a speed preferably slightly in excess of the rate of travel of the surface of the drum in coordination with the appearance of the developed image at the transfer station. In this manner, the sheet material is introduced between the feed rollers and is thereby brought into contact with the rotating drum at the correct time and position to register with the developed image.

The transfer of the xerographic powder image from the drum surface to the transfer material is effected by means of a corona transfer device 21 that is located at or immediately after the point of contact between the transfer material and the rotating drum. The corona transfer device 21 is substantially similar to the corona discharge device 15 in that it includes an array of one or more corona discharge electrodes that are energized from a suitable high potential source and extend transversely across the drum surface and are substantially enclosed within a shielding member. In operation, the electrostatic field created by the corona charging device 11 is effective to tack the transfer material 14 electrostatically to the drum surface, whereby the transfer material moves synchronously with the drum while in contact therewith. Simultaneously with the tacking action, the electrostatic field is effective to attract the toner particles comprising the xerographic powder image from the drum surface and cause them to adhere electrostatically to the surface of the transfer material.

Subsequent to the image development station is positioned a transfer material stripping apparatus or paper pick-off mechanism, generally designated 22, for removing the transfer material from the drum surface and, to direct it onto a horizontal conveyor 23 having an endless conveyor 24, whereby the sheet material is carried to a fixing device in the form of a fuser assembly 25, whereby the developed and transferred xerographic powder image on the sheet material is permanently fixed thereto.

Figure 3:
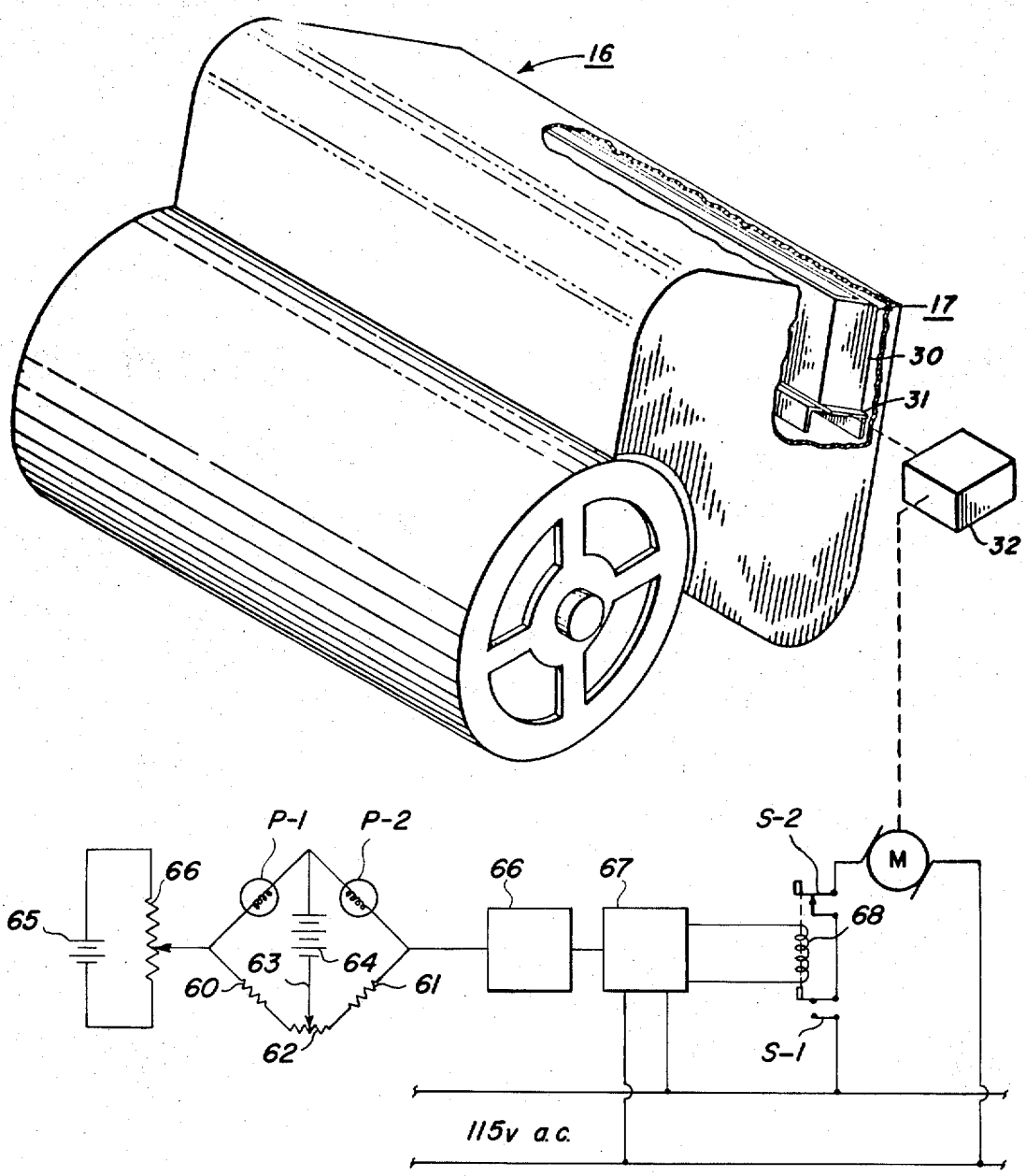
FIG. 3 is a schematic illustration of a toner dispensing arrangement with portions of the sensor applied to the associated circuitry.

Referring now to FIG. 3, the toner dispenser 17 consists of a hopper or container 30 for the toner particles to be dispensed. Although the hopper or container 30 may be made in any size or shape, the hopper shown is formed as a rectangular open-ended box having vertical side and end walls.

The bottom wall of the hopper 30 may comprise a sliding perforated plate 31 adapted for sliding movement longitudinally of the hopper for metering the flow of toner from the hopper. The toner thus dispensed is mixed with the developing material in the developer housing 16 to become almost immediately effective in the developing process. The metering provided by the plate 31 may be controlled by a mechanical device, generally indicated by the reference numeral 32, such as a cam plate or linkage system which converts rotary motion to reciprocable movement. Preferably, a single revolution of a rotary element in the device 32 will produce one reciprocable cycle of the plate 31, thereby insuring the dispensing of predictable quantities of toner.

In the operation of the toner dispenser, a supply of toner particles is placed within the hopper, the hopper walls and the dispensing plate 31 forming a reservoir for the toner particles. Upon reciprocation of the plate 31 by the device 32, a metered quantity of toner particles will be permitted to cascade through the openings in the plate where they will fall to the reservoir portion of the housing 16.

Since the toner dispenser 17 dispenses a uniform quantity of toner for a given stroke length of the metering plate 31, it is apparent that the quantity of toner delivered by the toner dispenser may be varied by either varying the length of stroke or by varying the number of strokes per actuation of the device 32.

Figure 2:
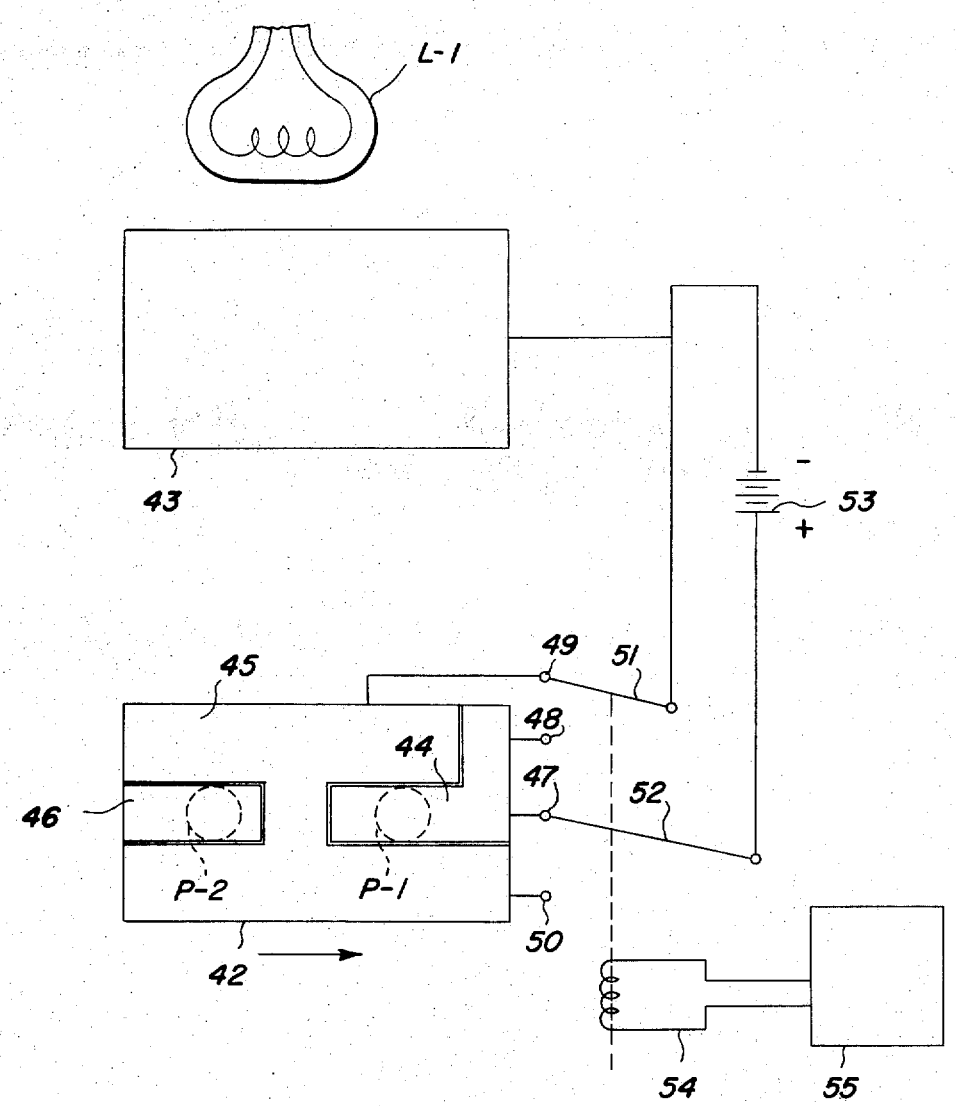
FIG. 2 is a schematic illustration of toner sensor utilized in the machine shown in FIG. 1 and a charging circuit for the sensor.

In order to control the dispensing of toner from the toner dispenser 17, there is shown in FIG. 2 the details of an automatic toner control system which ultimately causes rotation of the rotary element in the device 32 in single revolution step-by-step operation in accordance with the density of the developed image on the drum 14. Basically, the automatic toner dispensing system comprises a toner sensor 40 generally indicated by the reference number mounted within the developer housing 16 by suitable means which electrically insulates the sensor from surrounding structures and, a collecting plate 41 mounted above the sensor 40. The plate 41 is arranged below the up-moving buckets 42 of the conveyor system for the developer 16 and is adapted to receive some developer material falling from each bucket. Suitable small holes formed in the buckets may be provided for this purpose. The plate 41 is positioned at an angle, approximately 20° relative to the vertical and arranged in such a way as to guide developer material falling thereon into the sensor 40.

As shown in FIG. 2, the sensor 40 comprises a lower sensor plate 42 and an upper sensor plate 43 arranged parallel to the plate 42 slightly spaced therefrom (see FIG. 1). The lower plate 42 comprises a thin glass sheet having a thin transparent layer of a conductive oxide. Preferably, the plate 42 is formed of "NESA" glass, a trademark of the Pittsburgh Glass Company, which is generally tin-oxide coated glass that is transparent to white light.

A pattern 44 is formed on the plate 42 and is of rectangular shape being produced by scribing through the oxide layer in order to electrically separate the pattern 44 from the remaining portion 45 and has a rectangular shaped pattern 46 which has a width approximately equal to the width of the pattern 44 and in alignment therewith when viewing the plate 42 along the illustrated arrow. The pattern 46 is also formed by scribing through the oxide layer on the plate 42 however, whereas the pattern 44 is connected to an electrical circuit, as will be described hereinafter, the pattern 46 is free of any electrical influence at all times. As will be described hereinafter, the arrow is indicative of the direction of flow of developing material as it is applied to the sensor. The plate 43 is also formed of "NESA" glass, however, there are no patterns inscribed thereon.

In order to accumulate toner in an amount fairly indicative of the total amount of toner or, toner concentration, the lower plate 42 has applied thereto an electric potential of a polarity and amount to attract and retain toner particles for some predetermined unit of time. During this unit of time, the light transmission through this accumulated toner will be determined in terms of toner concentration for the developer mechanism. To this end, the pattern 44 of lower plate 42 is electrically connected to a first switch contact 47 and a second switch contact 48. Similarly, the conductive portion 45 of the lower plate is connected to terminals 49 and 50. The contacts are part of a double pole single throw switch which includes a first switch arm 51 movable between the contacts 48 and 49 and a second switch arm 52 movable between the contacts 47 and 50.

Each of the arms 51, 52 are connected to a pole of a source 53 of direct current and for illumination purposes. These connections are shown in FIG. 2 with the positive pole of source 53 being connected to the arm 52 thereby providing the pattern 44 with a positive potential and with the negative pole being connected to the arm 51 thereby providing the portion 45 with negative potential. This electrical configuration is merely illustrative and has been chosen for descriptive purposes because of the particular charge chosen for the toner particles, which in this illustration, is negative. The positioning then of the switch arm 51, 52 is such then that toner particles will be attracted to the pattern 44 and repelled from the portion 45. To complete the circuit to the sensor elements, the upper plate 43 is also connected to the negative pole of the D.C. source 53, or to that pole having a polarity similar to that of the toner particles.

In order to exhibit high sensitivity and rapid response time, the sensor 40 is adapted for intermittent sensing action and to this end, the switch arms 51, 52 are mechanically connected together and to the armature of a solenoid 54. A switchable timing device 55 is connected to the solenoid for periodically energizing the same. As shown in FIG. 2, with the switch arms 51, 52 positioned in contact with the contacts 49, 47, respectively, toner particles as they cascaded through the sensor 40 will be attracted to the pattern 44, during this attract cycle and repelled from the portion 45, after a short unit of time has elapsed, say 10 seconds, the timer will energize the solenoid 54 for switching the arms 51, 52 against the contacts 48, 50, respectively. During the attract cycle, toner will accumulate upon the pattern 44 and in an amount indicative of the amount of toner in the developing system. When the timer 55 has effected switching of the arms 51, 52 against the contacts 48, 50, respectively, the polarity of the pattern 44 and the portion 45 are reversed whereupon the pattern 44 assumes a negative polarity and portion 45 of a positive potential. In this manner, the pattern 44 will repel the accumulated toner and new toner cascading down the inclined lower plate 42 during this cycle. With the polarity thus reversed, the pattern 44 is cleaned by the cascading developing material and thereby is conditioned during this clean cycle for another attract cycle. As will be described hereinafter, it is during the attract cycle that the light transmission through the pattern 44 is measured.

Throughout both the clean and attract cycles, the upper sensor plate 43 retains a negative potential, or that polarity which is similar to the polarity acquired triboelectically by the toner particles. As previously stated, for illustration purposes, the polarity is negative and, with the plate 43 being negative, toner particles are repelled by the plate and directed toward the lower plate 42. In effect then, the upper plate remains fairly clean during operation of the toner sensor.

As shown in FIGS. 1 and 2, a first photocell P–1 is arranged below and in alignment with the pattern 44 and a second photocell P–2 is arranged below and in alignment with the clear pattern 46. The photocells are positioned adjacent the lower surface of the plate 42 so that toner particles cascading through the sensor 40 will intercept light rays from a light source L–1 positioned above the plate [42] *43* which shields the source from drifting toner. The relative positioning of the photocells is such that the cell P–1 will receive the light rays through cascading developer streams, the accumulated toner on the pattern 44 and, the dust and other particles in the air between the plates 42 and 43 while the cell P–2 will receive the light rays only through the developer stream and the dust and toner particles in the air. In effect then, the cell P–2 is a compensating cell since it "sees" all that the cell P–1 "sees" except for the accumulated toner.

Electrically, the photocells P–1, P–2 form two legs of a bridge circuit which is illustrated schematically in FIG. 3. In the bridge circuit the effects of the developer stream and toner in the air between the sensor plates are subtractive so that the total effect across the bridge is due only to the light transmitted through the amount of toner deposited on the pattern 44. The other two legs of the bridge circuit comprise two fixed resistors and portions of a variable resistor 62 having its wiper arm 63 connected to the negative terminal of a D.C. source 64. To complete the bridge circuit, the junction between the photocells is connected to the positive terminal of the D.C. source. The power supply for the bridge circuit is derived *therefrom.* [from a] A suitable D.C. source 65 and potentiometer 66 which has its wiper arm connected between the resistor 60 and the photocell P–1 *are utilized to control the sensitivity of the sensing circuit.*

The bridge unbalance output is led to a Schmitt trigger 66 connected to an amplifier 67 which is utilized to amplify the signal produced by the Schmitt trigger and to drive or energize a solenoid 68 having a normally open switch S–1 connected in series with a normally closed switch S–2. The switches S–1 and S–2 are in series *with* [within] motor M and are connected to a suitable source of electrical power such as conventional house current. Upon energization of the solenoid 68, the switch S–1 closes to cause energization of the motor M. The shaft for the motor M or the mechanical device 32 may be provided with a cam arrangement (not shown) adapted to actuate the normally closed limit switch S–2 to an open position for a major portion of each revolution of the shaft for motor M. With solenoid 68 being continuously energized during an undertoned condition of the image upon the drum 14, the motor M will be intermittently energized to impart intermittent actuation of the mechanical device 32.

During normal operation of the automatic toner dispensing apparatus, the sensor light source L–1 is continuously energized for presenting light upon the plate 42. This light is fairly evenly distributed upon the plate and the light transmitted through the pattern 44 and clear pattern 46 are sensed by the photocells P–1, P–2, respectively, and compared by the bridge circuit. The resistor 62 is adjusted so that there is a bridge balance with zero output between the results of the light impinging upon the cell P–1 at the end of the attract cycle and the results of the light impinging upon the cell P–2. This balance will be determined by the desired density of the toner that accumulates on the pattern 44. With a balanced condition of the bridge the Schmitt trigger will have zero output for the solenoid 68. As the toner supply in the developer housing 16 deplets during normal xerographic processing, the density of the toner that accumulates on the pattern 44 will lessen. With a density lower than the predetermined level which was used to balance that bridge circuit, the bridge will swing out of balance and when differential current in the trunks of the bridge is sufficiently high, the Schmitt trigger, which in effect is a level detector will produce an electrical pulse causing a momentary energization of the solenoid and closing of the contacts S–1. For each electrical pulse produced in this manner, the motor shaft for motor M will rotate one complete revolution to actuate the dispensing toner into the developer housing.

As the density of the toner on the plate pattern 44 increases, the balance of the bridge circuit will become restored thereby terminating further actuation of the toner dispenser. The sensitivity of the sensing circuit can be varied by the parameters chosen for the resistors 60, 61 and 62 and the strength of the D.C. sources 64, 65. These components will determine the output level of the bridge circuit and may be varied so that a high unbalance must be present before a level can be detected by the Schmitt trigger. This condition would evolve that it is desirable to ave a relatively wide density range for xerographic reproductions. If high quality contrast is needed in the reproductions, then a very sensitive bridge balance is necessary whereby the slightest unbalance will demand toner dispensing and replenishment.

The toner dispenser 17 functions to sift toner material into the developing material already present in the developer housing. In order to ensure uniform distribution of new toner to bring the toner-to-carrier relationship or ratio back to the desired level in a minimum of time, the toner dispenser extends horizontally substantially across the upwardly moving buckets which are in motion to cascade toner over the drum surface throughout its entire width.

Some of the newly dispensed toner may be caused to deposit on suitable baffle plates. To cause the particles to be mixed with the remaining developing material and thereby ensure adequate mixing of at least a portion of the new toner, narrow slots may be formed in these plates whereby a portion of the material sliding down this plate is caused to pass through the slots and over the surface of the developing material supply at the bottom of the housing.

While the invention has been described with reference to the structure disclosed herein, it is not confined to the details set forth and this application is intended to cover such modifications or changes as may come within the purposes of the improvements or the scope of the following claims. For example, other means for producing actuation of the mechanism 32 or for that matter, dispensing by the dispenser 17, the signals produced by the Schmitt trigger 66 may be provided on the machine.

What is claimed is:

1. A toner dispensing control system for use in an electrostatic reproduction apparatus having an electrostatic photosensitive plate and a developer mechanism adapted to apply electrostatically charged toner in developer material to exposed electrostatic latent images on the plate thereby producing powdered toner images thereon including, a container for the toner;

means for dispensing toner from the container into the developer mechanism for replenishing the developing material with toner;

an actuator device associated with the said dispensing means for controlling the introduction of the toner into the developer mechanism;

sensing means associated with said developing mechanism and arranged to be applied to developer material therein, said sensing means including a transparent element having portions with distinct electrical properties and means for directing the flow of some developer material thereacross in a steady stream, a light source arranged to illuminate said portions and a light sensitive device arranged to receive light rays projecting through each of said portions to produce electrical outputs in accordance therewith, *and a second transparent element electrically biased with a polarity the same as the polarity of said toner arranged between the light source and the first mentioned transparent element whereby the stream of developer material will be directed between said element;* means for comparing said outputs and producing a discrete signal indicative of a deviation in said outputs; and means responsive to said signal and associated with said dispensing means for actuating the same to dispense toner into the developer mechanism.

[2. The toner dispensing control system in claim 1 wherein said sensing means includes a second transparent element electrically biased with a polarity the same as the polarity of said toner arranged between the light source and the first mentioned transparent element whereby the stream of developer material will be directed between said elements.]

3. A toner dispensing control system for use in an electrostatic reproduction apparatus having an electrostatic photosensitive plate and a developer mechanism adapted to apply electrostatically charged toner in developer material to exposed electrostatic latent images on the plate thereby producing powdered toner images thereon including a container for the toner, means for dispensing toner from the container into the developer mechanism for replenishing the developing material with toner, an actuator device associated with the said dispensing means for controlling the introduction of the toner into the developer mechanism, sensing means associated with said developing mechanism and arranged to be applied to developer material therein, said sensing means including a transparent element and means for directing the flow of some developer material thereacross in a steady stream, a light source arranged to illuminate said transparent element and a light sensitive device arranged to receive light rays projecting through said transparent element to produce an electrical output in accordance therewith, means for comparing said output with a predetermined value and producing a signal indicative of a deviation from said value, means responsive to said signal and associated with said dispensing means for actuating the same to dispense toner into the developer mechanism, said transparent element being formed with an electrically conductive control pattern and has an area that is free of electrical influence and positioned to be illuminated by said light source, said pattern and said area being in alignment relative to the movement of the developer material across said transparent element, a second light sensitive device arranged to receive light rays projecting through said area and associated with said means for comparing said output.

4. A toner dispensing control system for use in an electrostatic reproduction apparatus having an electrostatic photosensitive plate and a developer mechanism adapted to apply electrostatatically charged toner in developer material to exposed electrostatic latent images on the plate thereby producing powdered toner images thereon including a container for the toner, means for dispensing toner from the container into the developer mechanism for replenishing the developing material with toner, an actuator device associated with the said dispensing means for controlling the introduction of the toner into the developer mechanism, sensing means associated with said developing mechanism and arranged to be applied to developer material therein, said sensing means including a transparent element and means for directing the flow of some developer material thereacross in a steady stream, a light source arranged to illuminate said transparent element and a light sensitive device arranged to receive light rays projecting through said transparent element to produce an electrical output in accordance therewith, means for comparing said output with a predetermined value and producing a signal indicative of a deviation from said value, means responsive to said signal and associated with said dispensing means for actuating the same to dispense toner into the developer mechanism, said transparent element being electrically conductive and being formed with a control pattern thereon, said control system including means for applying an electrical potential on the pattern of the opposite polarity as the charge on the toner and an electrical potential on other portions of the element of a polarity similar to that of the toner, said means for applying an electrical potential including a switching means and a timer device connected to said control pattern and said other portions and adapted to reverse periodically the polarity of the electrical potential thereon.

References Cited

The following references, cited by the Examiner, are of record in the patented file of this patent or the original patent.

UNITED STATES PATENTS 3,399,652 9/1968 Gawron ---------- 118—63

PETER FELDMAN, Primary Examiner

U.S. Cl. X.R.

118—9, 637